United States Patent [19]
Lloyd

[11] 4,092,834
[45] June 6, 1978

[54] FREEZE SEPARATION PLANT

[75] Inventor: Albert Ivor Lloyd, Dorset, England

[73] Assignee: United Kingdom Atomic Energy Authority, London, England

[21] Appl. No.: 750,351

[22] Filed: Dec. 14, 1976

[30] Foreign Application Priority Data

Jan. 28, 1976 United Kingdom ............... 3417/76

[51] Int. Cl.² .......................... B01D 9/04; C02B 1/12
[52] U.S. Cl. ........................................ 62/123; 62/533
[58] Field of Search ................ 62/123, 124, 533, 534, 62/535

[56] References Cited

U.S. PATENT DOCUMENTS

| | | | |
|---|---|---|---|
| 3,259,181 | 7/1966 | Ashley et al. | 62/535 |
| 3,478,531 | 11/1969 | Karnofsky | 62/123 |
| 3,620,035 | 11/1971 | Martindale et al. | 62/123 |
| 3,712,075 | 1/1973 | Smith et al. | 62/123 |
| 3,714,791 | 2/1973 | Peck | 62/123 |

Primary Examiner—Ronald C. Capossela
Attorney, Agent, or Firm—Larson, Taylor and Hinds

[57] ABSTRACT

A plant for reducing the impurity content of impure water by the immiscible refrigerant freeze process, for example a secondary refrigerant freezing plant employed for desalination, has its crystallizer sub-divided into a plurality of tiers of passageways and supplied in parallel with impure water. Thus the crystallizer may be built to a height which matches the configuration of the usual wash column so that together the two components can be housed in a conveniently cylindrical shell along with the decanter and the melter/condenser.

13 Claims, 4 Drawing Figures

BRINE
PRODUCT WATER
BUTANE VAPOUR
LIQUID BUTANE
ICE SLURRY

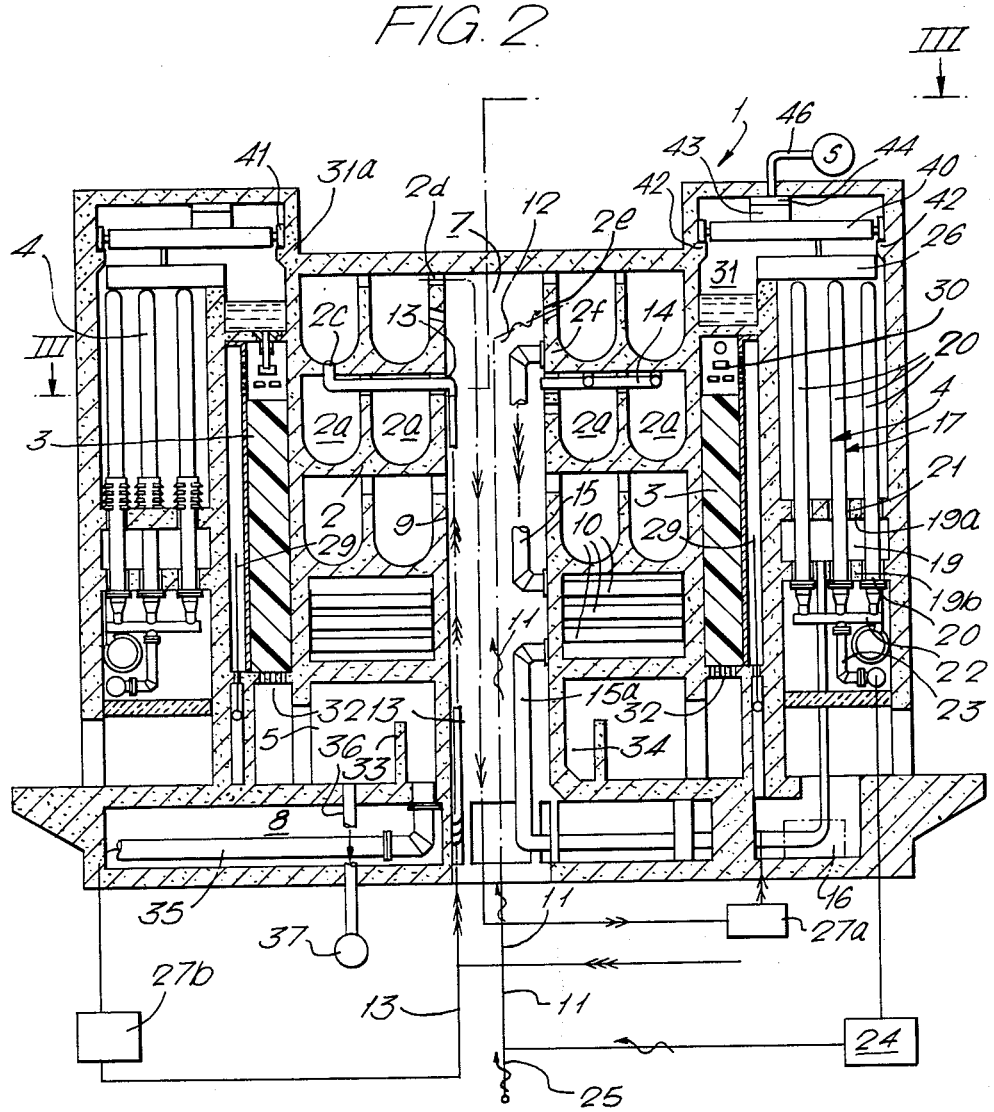

FREEZE SEPARATION PLANT

BACKGROUND OF THE INVENTION

This invention relates to plant for use in carrying out the separation of the impurity content of impure water by the immiscible refrigerant freeze process. The said process broadly comprises boiling the immiscible refrigerant in impure water to be processed, separating the ice crystals formed and melting the ice crystals to produce water purified to an acceptably low inorganic salt concentration. A plant for the said process must comprise a plurality of plant components each carrying out one or more process steps and thus provision must be made for transferring process materials between one component and the next. In attempting to reduce capital costs, designers' attention has been directed to the formulation of an integral design of plant so avoiding the need to duct process fluids between spaced apart plant components and at the same time easing thermal insulation problems. However this integral concept has not so far been achieved without compromising to some degree the operational efficiency of one or other of the plant components to the detriment of overall performance. This is a disincentive to integrate for, in plant of this kind, there is a definite relationship between the outline shape of a conventionally designed plant component and its efficient functioning which imposes constraints on the ultimate outline which the plant may assume.

The present invention aims to produce an integrated plant which compromises little, if at all, with operational efficiency.

Considering now the specific plant components of an immiscible refrigerant freeze separation plant, these comprise a crystalliser in which ice crystals are formed in the liquid to be treated by boiling in it a liquid refrigerant, a wash column in which an ice column is formed from compacted ice crystals, a condenser/melter in which refrigerant vapour is condensed in melting compacted ice scraped from the top of the ice column and a decanter in which the condensed refrigerant separates from the product water and is poured off the top of underlying water. Thus, whilst the wash column and condenser/melter are vertically orientated plant components which may be reasonably evenly matched in height, the crystalliser must be strictly limited in height. In practice; too deep a fluid flow in the crystalliser does not allow the secondary refrigerant liquid to evaporate on injection into the impure liquid due to the latter's hydrostatic head unless a very low refrigerant inlet pressure is to be employed. The decanter also tends towards a horizontal axis so that the fluids may lose velocity, separate and the less dense liquid may be decanted successfully.

SUMMARY OF THE INVENTION

According to the present invention plant for reducing the impurity content of impure water by the immiscible refrigerant freeze process includes a crystalliser component for producing ice crystals by boiling immiscible refrigerant in the water, the crystalliser component taking the form of a plurality of tiers, so that its overall height matches that of those plant components which tend towards a vertical outline shape whereby the plant components may be integrated in a single vessel of regular outline. The improvement in the crystalliser configuration leads to an advantageous sub-division of plant construction by which there is provided a freezer section for producing ice crystal slurry by boiling immiscible refrigerant in the impure water followed by a disengagement section in which entrained refrigerant separates from ice crystals, the freezer section taking the form of a number of tiers. Preferably each tier comprises an annular, endless, approximately horizontally extending passageway along which the impure liquid may be circulated, with the process liquid inlet, a refrigerant gas inlet, an ice slurry outlet disposed at spaced parts of the passageway. The subdivision of the crystalliser into tiers enables the superimposed annular passageways to circumscribe a central conduit for accommodating ducting and pipework. Conveniently, the central conduit may communicate at its base with one or more radial conduits which interconnect it to one end of the outer annulus which may contain plant auxiliaries. Pipework may occupy a part of these inter-connecting radial conduits.

The disengagement, region may comprise a helical tray or trays beneath, and co-axial with, the annular passageways.

Advantageously the single vessel serves as an insulated containment for the integrated plant and comprises an upstanding cylinder accommodating the multi-tiered crystalliser as a plurality of superposed annular passageways in structure defining a central duct which extends co-axially of the cylinder, the vessel having an outer annulus containing the wash column and an intermediate annulus housing the melter/condenser. The decanter then occupies a lower region of the vessel.

The vessel may be constructed in steel but concrete is to be preferred with the crystalliser passageways formed in massive concrete as cored holes or precast sections in block form. The disengagement zone may then occupy a special cavity formed in the concrete below the passageways.

DESCRIPTION OF THE DRAWINGS

In order that the invention may be better understood one embodiment thereof as applied to a brine desalting plant will now be described by way of example with reference to the accompanying drawings in which:

FIG. 2 is a diagrammatic form of the preferred embodiment.

DESCRIPTION OF THE PREFERRED EMBODIMENT

Figure 1:
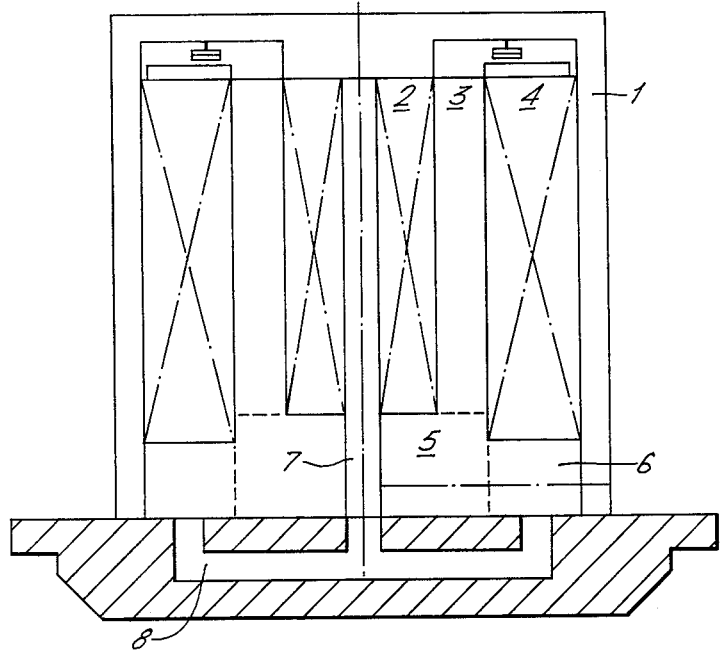
FIG. 1 is a block diagram showing how the components of the plant are integrated into a single cylindrical vessel.

Referring to FIG. 1, a freeze plant is integrated into a single, upstanding cylindrical reinforced concrete vessel 1 in the following manner:

A crystalliser 2 is housed in an inner annulus, a washer 4 arranged in an outer annulus and a melter/condenser 3 in an annulus intermediate these two. A decanter 5 for separation of liquid refrigerant from the product is situated beneath the crystalliser and melter/condenser. In the compact arrangement described below, a cylindrical vessel of less than 90 foot external diameter and an overall height of about 60 feet may accommodate a plant having an output of 2½ MIGD of desalted water.

This compactness is attributable at least in part to the provision of a crystalliser operable in the "stirred tank"

mode, yet is built to a height corresponding to that of each of the washer and the melter/condenser and circumscribing a central axial gas duct 7 also useful for service and process piping. Communicating with the bottom of the duct 7 are a number of radial access conduits 8, leading to an annulus 6 below the washer 4.

Figure 3:
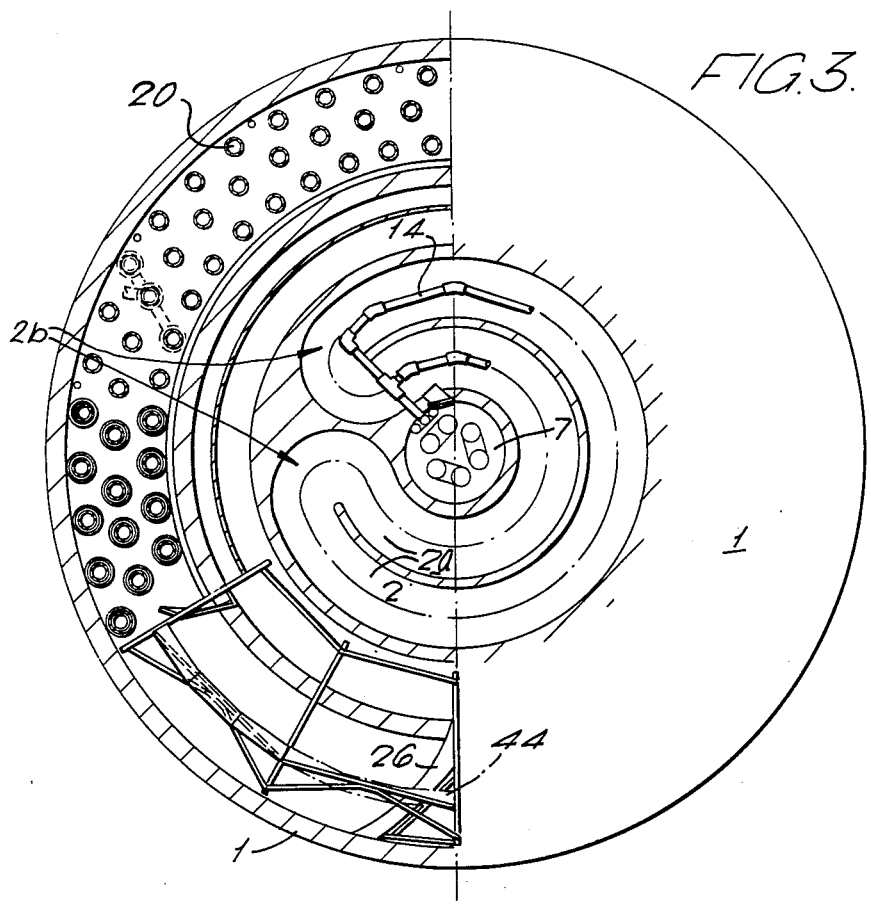
FIG. 3 is a section on the line III—III of FIG. 2.
Figure 4:
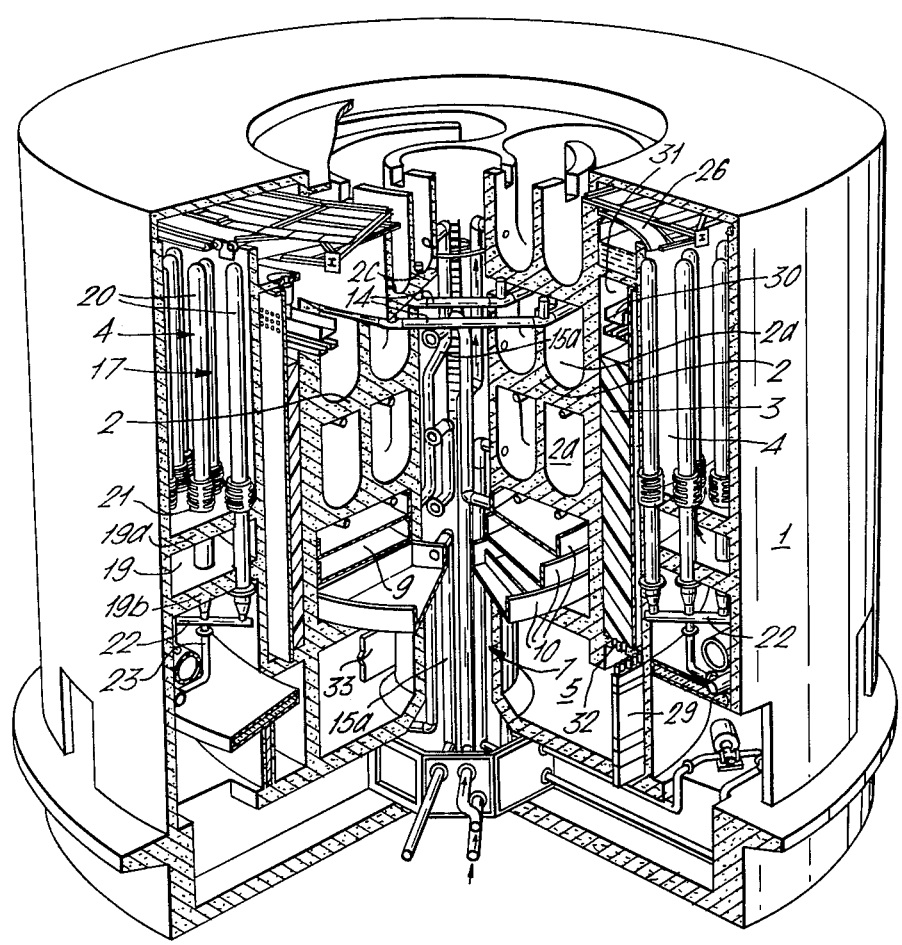
FIG. 4 is a perspective view of the plant in part broken away to show the interior.

Reference to FIG. 2 shows how the crystalliser 2 which normally tends to a horizontal configuration is constructed to fit a vertical annulus. As shown, the cylindrical vessel 1 is reinforced concrete and has its central axial duct 7 defined by a concrete wall 9 integral with bulk concrete in which three tiers of separate horizontal passages 2a form a freezer section of crystalliser. Each tier comprises a pair of concentric horizontal tracks (FIG. 3) which unite at 2b to form an endless passageway around which brine may circulate whilst it is cooled by the boiling of a liquid refrigerant, in this case butane. Each passage 2a has its liquid butane inlet 2c in its base, its butane vapour outlet 2d near its top, its tangential raw brine inlet 2e and its ice/brine slurry outlet 2f. The butane vapour discharges directly into the central duct 7 whilst the other outlets/inlets are served by pipes extending within the duct 7. Vapour from duct 7 is taken via one of the radial ducts 8 to a primary compressor 27a.

A secondary crystalliser or disengagement section is housed in a cavity beneath the lowermost tier and receives ice/brine slurry from outlets 2f. This section comprises three helical trays 10 arranged as a three start helix around the duct 7 so constituting three parallel flow paths in which ice crystals may grow and butane vapour disengage from the slurry.

Raw brine feed is pumped up to each brine inlets 2e through three separate feedpipes one of which is shown at 11 and supplied in parallel to each of the separate tiers via branch pipes 12 arranged to lie in a common vertical plane. Liquid butane is pumped through three pipes as at pipe 13 one for each tier into ring mains 14 communicating with inlets 2c. Outlets 2f for the slurry from each tier also lie in a common vertical plane, the outlet pipes only one of which is shown at 15 being bent round to suit this configuration.

The effluent from the trays 10 is a slushy ice brine mixture. A pipe such as pipe 15a from each of the three trays 10 leads to a slurry pump 16 located in the annulus 17. The slurry pump 16 lifts the slurry below the outer annulus 17 where it enters the washer 4. The washer is of known construction and is similar to that described in the following reference Proc of the 3rd International Symposium on Fresh Water from the Sea Vol 3 pp 51–69 1970. Suffice to say here that an annular inlet plenum chamber 19 which is defined between a pair of annular horizontal, vertically spaced walls 19a 19b receives the slurry from the pumps 16. The lower wall 19b supports the base of elongated vertical thimble or drain tubes 20 with closed upper ends; towards the upper end the tube walls are peppered with perforations forming drain screens for the brine. The tubes 20 pass with clearances 21 through holes in the upper wall 19a and centred by radial fins (not shown). Below the wall 19b, the tubes 20 communicate with a header pipe 22 leading to a downcomer 23. The latter leads brine washed off ice crystals to the inlet of a brine pump 24 for re-circulation via pipe 11. Make-up brine may be added from supply 25. As will be understood from the aforementioned reference, the brine/ice mixture rises in the annulus 17 and the ice compacts as an annular column in the form of a porous solid and the brine flows upwardly through this column and eventually through the perforations in the thimble tubes 20. Thence the brine flows through the bores of tubes 20 into the header pipe 22.

Mounted above the annulus 17 are a number of coplanar scraper blades 26 forming an annular scraper blade assembly whose function is to harvest the ice off the top of the outer annulus and to move it into the top of the intermediate annulus 3. To provide a large surface area for melting, the greater part of annulus 3 is filled with small plastics artefacts of saddle-like shape. Butane vapour from a primary compressor 27a outside the vessel is delivered into a radial duct 3 which is inter-connected with a plastics lined annular duct 29. The latter extends within the partition wall separating annuli 3 and 4 and at its upper end leads through the partition wall to annulus 3. In an ante chamber 31 above the melter/condenser, the ice is mixed with a bleed of product water so that it is reslurried by admixture with product water, delivered via pipe 31a, so that the slurry is fluid enough to be distributed over the whole cross section of the intermediate annulus 3. The reconstituted slurry flow is distributed by trays 30 and then con-currently with butane vapour over the plastics artefacts, the slurry melting and the butane condensing. The resulting mixture of product water and butane liquid pass through outlets 32 into the annulus 5 shaped to act as a decanter. To this end an arcuate wall 33 is upstanding from the floor of the annulus 5, so that, as the circulatory flow of fluids results in the less dense butane rising to an upper layer above the denser water, so the butane flows over the wall 33 into an inner volume 34 whence, separated now from the product water it can be withdrawn via outlet pipe 35 leading to a secondary butane compressor 27b. Product water on the other hand is withdrawn from the decanter through downcomer pipe 36 into product water main 37. The butane is delivered as liquid from the decanter 5 into risers 13 for re-use in the crystalliser. The scraper blade assembly comprises six helical blades 26. The blades which are carried by a common carriage 40 have cone wheels 41 running on circular rails 42. On the upper part of the carriage are mounted a series of reaction plates 43 which serve as armatures with respect to stators 44 of linear electric motors which are themselves carried at spaced intervals on the underside of the roof of the vessel 1. The motors are energised from a supply S outside the vessel and fed to the motors via cables 46 which extend through a sealed penetration in the vessel roof.

A linear drive to the reaction plates is permissible owing to the large diameter of the track and scraper blade carriage. By the use of linear motors the need for supporting a rotary motor centrally of the vessel is obviated rotary and seals for the motor drive are thus obviated.

I claim:

1. In a plant for reducing the impurity content of impure water by an immiscible refrigerant-freeze process, the plant including a two stage crystallizer for producing ice crystals in the impure water by boiling the immiscible refrigerant in the impure water in the first stage and disentraining the vapor in the second stage, the improvement wherein the crystallizer first stage is arranged as a number of tiers of passageways and includes means for introducing refrigerant into impure water in the passageways defining each tier, conduit means for leading ice crystal slurry from the first stage to the second stage wherein disentrainment of vapor is effected, and means for producing water having a reduced impurity content from the ice crystals.

2. Plant as claimed in claim 1 in which the crystalliser has a freezer section which comprises a several tiers of at least partially annular passageways which circumscribe a central conduit for accommodating ducting.

3. Plant as claimed in claim 2 in which the central conduit itself constitutes a duct for refrigerant vapour withdrawn from the crystalliser.

4. Plant as claimed in claim 2 in which the crystalliser has beneath the freezer section a disengagement section disposed and duct means through which the ice crystal slurry descends from the freezer section into the disengagement section.

5. Plant as claimed in claim 2 having ducting communicating said conduit with an annular space bounding the crystalliser and serving as a melter/condenser.

6. Plant as claimed in claim 1 in which means are provided for supplying each tier in parallel with impure water and means for injecting refrigerant into the impure water at a number of positions along the passageways and means for withdrawing ice crystal slurry and refrigerant vapour therefrom.

7. Plant as claimed in 1 in which at least some of the passageways are divided into parallel flowpaths by partition means.

8. Plant as claimed in claim 7 in which the passageways of at least one tier are part annular, divided by an arcuate partition into an endless passageway.

9. Plant as claimed in claim 1 having a disengagement section comprising a plurality of helical passages formed in an annular compartment below the freeze section, means for ducting ice crystal slurry to the upper regions of each of said passages and for withdrawing ice crystals from a lower region thereof and means for venting disentrained vapour into a central duct.

10. Plant as claimed in claim 9 including further duct means for transferring ice crystals from the disengagement section of the crystalliser to a annular wash column disposed about the crystalliser.

11. Plant for reducing the impurity content of impure water comprising an upright, generally cylindrical, shell closed at the top, a central, axially extending conduit within the shell, annular partition means dividing the annular interior between the duct and the outer wall into inner, intermediate and outer, annular zones accommodating respectively a two-stage crystallizer, a melter/condenser and a wash column, duct means in the central conduit for leading refrigerant liquid and impure water to the crystalliser, said two stage crystallizer comprising a first upper first stage comprising a plurality of annular flow paths arranged in tiers around the central conduit, duct means supplying impure water and refrigerant gas to the respective tiers in parallel to create an ice slurry, a second, lower stage comprising a further annular flowpath about the central conduit, passage means leading slurry from the first stage to the second stage, means for ducting ice from the second stage to the lower region of the outer annular zone to enter the wash column, means for transferring washed ice from the top of the wash column to the melter/condenser in the intermediate annular zone and means for withdrawing product water from the intermediate annular zone.

12. Plant as claimed in claim 11 in which the second stage of the crystallizer comprises a plurality of helical trays co-axial with the axial conduct.

13. Plant as claimed in claim 12 in which the second stage crystallizer has trays arranged as a multistart helix.

* * * * *